United States Patent [19]
Adamek

[11] 3,837,513
[45] Sept. 24, 1974

[54] MOTORBIKE LOADER-CARRIER

[76] Inventor: Victor Adamek, 1210 Opal St., San Diego, Calif. 92109

[22] Filed: Aug. 31, 1972

[21] Appl. No.: 285,199

[52] U.S. Cl. .............................. 214/450, 214/75 H
[51] Int. Cl. ............................................... B60r 9/00
[58] Field of Search ...... 214/450, 75 H, 75 T, 75 R; 187/19

[56] References Cited
UNITED STATES PATENTS

| | | | |
|---|---|---|---|
| 668,627 | 2/1901 | Crow | 187/19 |
| 3,291,261 | 12/1966 | Robb | 214/75 R |
| 3,516,559 | 6/1970 | Walter | 214/75 R |
| 3,655,082 | 4/1972 | Garrett | 214/450 |

*Primary Examiner*—Robert J. Spar
*Assistant Examiner*—John Mannix
*Attorney, Agent, or Firm*—Robert O. Richardson

[57] ABSTRACT

A motorbike loader-carrier on the rear of a camper vertically movable for loading and unloading and horizontally swingable while loaded to permit access to the rear storage compartment or door of the camper.

7 Claims, 7 Drawing Figures

PATENTED SEP 24 1974					3,837,513

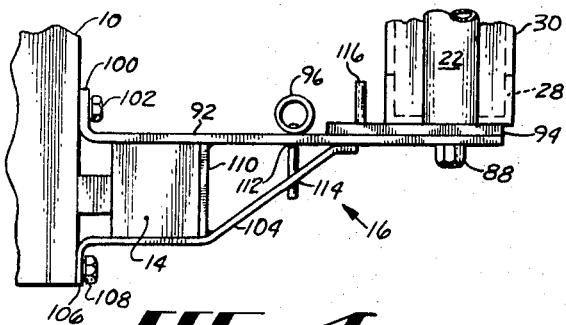
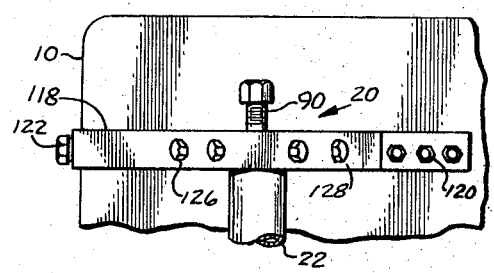
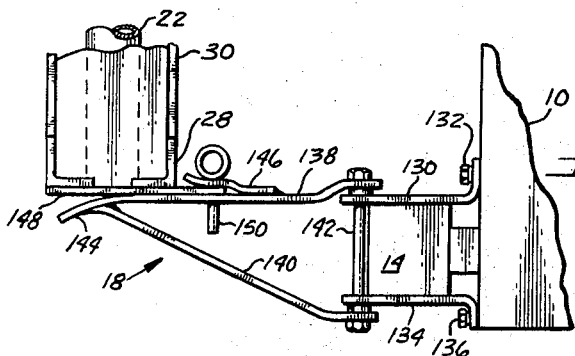
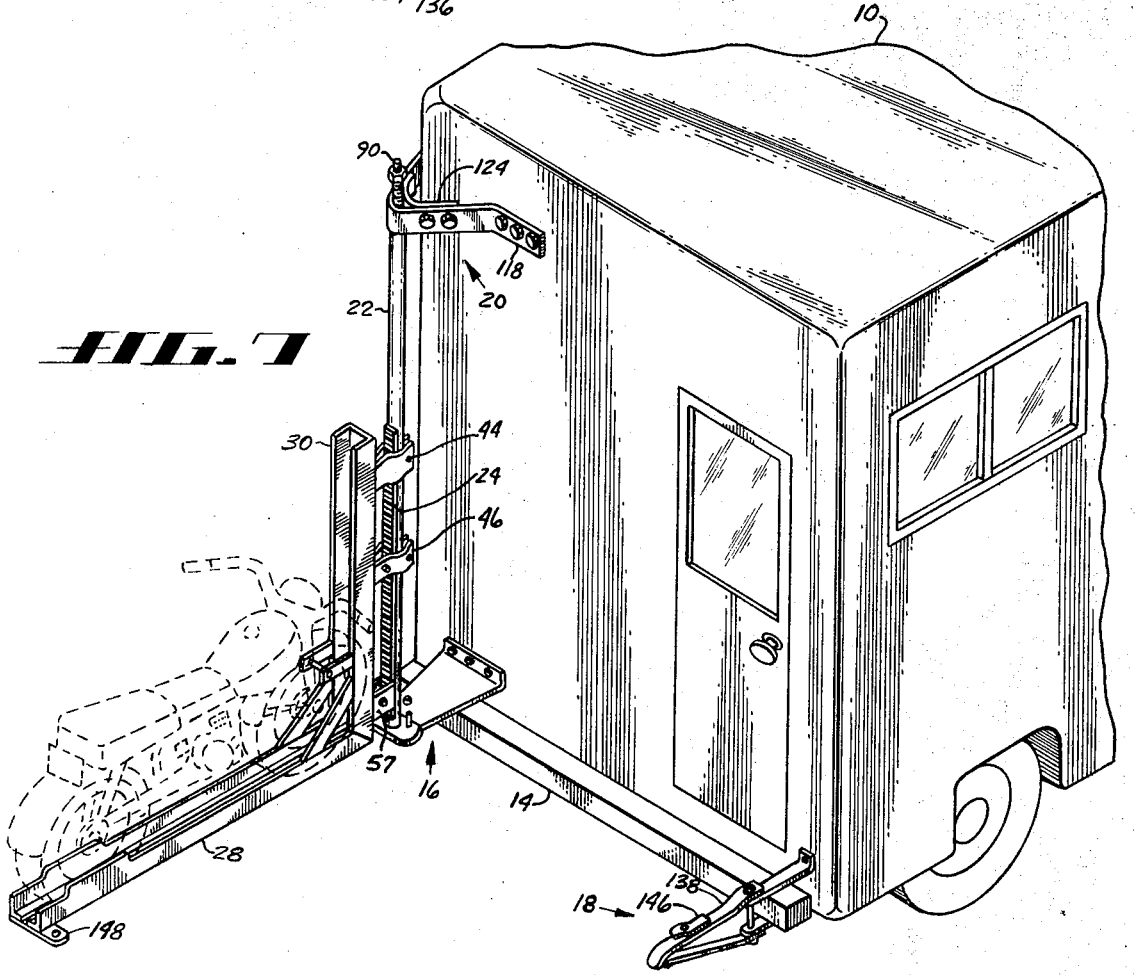

MOTORBIKE LOADER-CARRIER

BACKGROUND OF THE INVENTION

Frequently motorbikes are mounted on the rear of camper trucks for transportation to a desired destination where the motorbike may then be used for local transportation. One type of carrier for this purpose comprises a cycle-supporting platform rigidly mounted in elevated position on the camper for supporting the cycle wheels. Bodily lifting of the cycle to and from this travel position on the camper is difficult because of the size and weight of most motorbikes. Ramps and lifts have been devised to assist in the movement of the motorbike to its travel position. These tend to be elaborate, expensive and to interfere with access into the camper from the rear.

SUMMARY OF THE PRESENT INVENTION

The structure of the present invention comprises a support for a motorbike, a lifting mechanism to raise the support to travel position, mounting brackets for attaching the support and lifting mechanism to the camper, and attachments for pivoting the support while in raised position to provide access to the rear of the camper.

The lift mounting bracket may be either attached to the rear bumper or to the camper frame. The support positioning bracket is similarly mounted to receive and hold the other end of the support. Near the top of the camper housing is an appropriate mounting bracket to secure the upper end of the lifting mechanism. The lifting mechanism is adapted for pivotal movement on the lift mounting brackets and has lift means cooperative with lift means on the support to provide vertical movement of the support between its load and travel positions. The motorbike support includes a horizontal platform on which the motorbike rests, and a vertical member at one end on which are mounted brackets which fit around the lifting mechanism for pivotal and vertical movement of the support. The other end of the support is releasably attached to the support positioning bracket for travel and for pivotal movement of the support for access to the rear of the camper.

BRIEF DESCRIPTION OF THE DRAWINGS

FIG. 4 is an end view of the lower lift mounting bracket;

FIG. 5 is a side view of the upper lift mounting bracket;

FIG. 6 is an end view of the support positioning bracket; and

FIG. 7 is a perspective view of the motorbike in lift position and pivoted rearwardly to provide access to the rear of the camper.

DETAILED DESCRIPTION OF DRAWINGS

Figure 1:
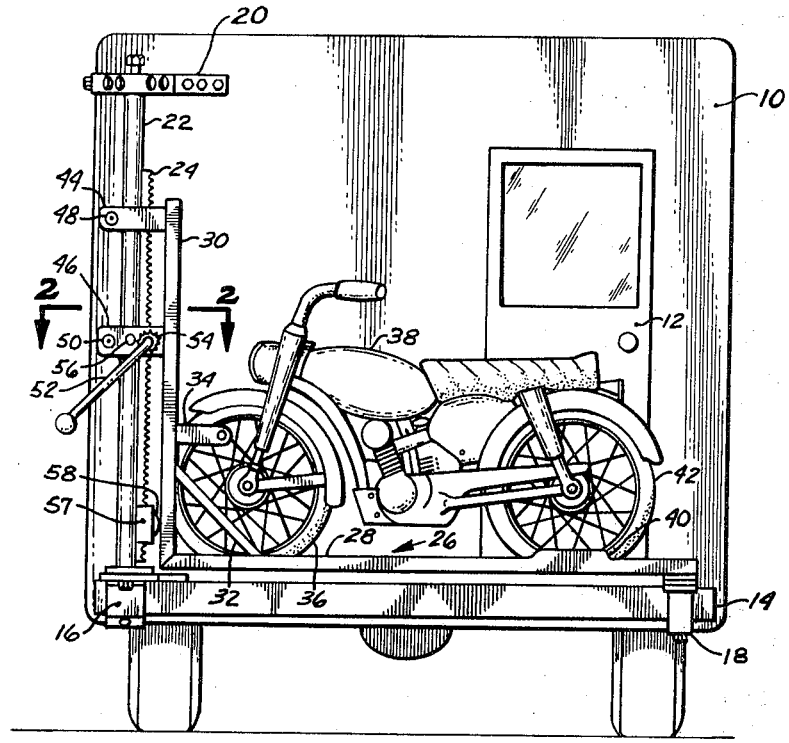
FIG. 1 is a side elevational view of the cycle carrier affixed to a vehicle and illustrating the carrier supporting a cycle in elevated travel position.

Referring now to FIG. 1 there is shown the rear of a camper 10 having a rear door 12 and a rear bumper 14 over which is mounted lower lift mounting bracket 16 and support positioning bracket 18. An upper lift mounting bracket 20 is attached near the top of the camper. These brackets are shown in greater detail in FIGS. 4, 5 and 6 and will be more fully described hereinafter.

Between lift mounting brackets 16 and 20 and pivotally mounted therebetween is a lift support 22 having a gear rack 24 attached thereto to facilitate lifting of motorbike support 26.

Motorbike support 26 consists of a horizontal support platform 28 welded at one end to a vertical member 30 to form an L-shaped unit. Channel iron construction is preferred for extra strength. A brace 32 connects diagonally across the corner thus formed and a bike locking bracket 34 on support 30 retains wheel 36 of bike 38 as shown. Lips 40 on platform 28 retain wheel 42 on the platform.

A pair of brackets 44, 46 welded to vertical member 30 extend around lift support 22 and have rolling engagement therewith by rollers 48, 50. Bracket 46 also has a crank 52 with gear 54 rotatably mounted thereon. Gear 54 engages the teeth of gear rack 24 so that rotation of crank 52 causes gear 54 to move vertically along the rack 24. This, in turn, moves support 26 vertically between its lower load position to its upper travel position as shown. A pin 56 is engageable through bracket 46 and lift support 22 to maintain support 26 in its vertical upper position, even when pivoted outwardly for access to door 12.

An additional guide 57 and roller 58 on lift support 22 additionally supports vertical member 30 when the support 26 is pivoted away from the rear of the camper.

Figure 2:
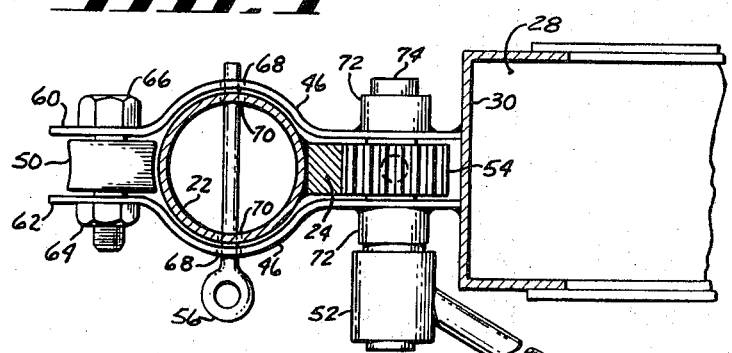
FIG. 2 is a top plan view of the cycle carrier taken along line 2—2 in FIG. 1.

Reference is now made to FIG. 2 wherein is shown bracket 46 welded to vertical member 30. A similar bracket 46' is similarly attached and passes around the opposite side of lift support 22. Roller 50 is attached to their outer ends 60, 62 by means of a nut 64 and bolt 66. Roller 50 bears against lift support 22, as does roller 48 on bracket 44 shown in FIG. 1, in supporting platform 26 horizontally. Pin 56 is shown inserted through openings 68 in the brackets and aligned openings 70 in lift support 22.

Between vertical member 30 and lift support 22, brackets 46 and 46' have a bearing 72 into which an axle 74 has been inserted. Gear 54 is mounted on the axle 74 between the brackets 46, 46' for engagement with gear rack 24. Crank 52 fastens onto axle 74 and may be manually rotated by turning handle 76.

Figure 3:
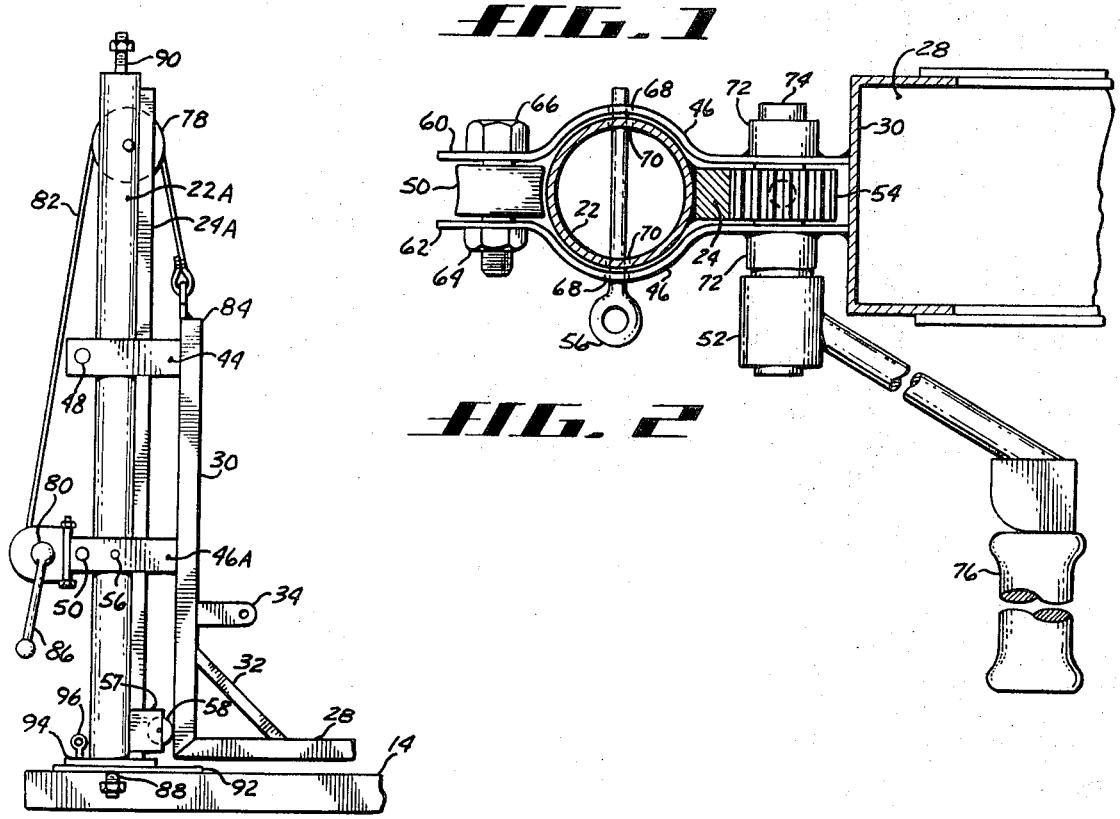
FIG. 3 is a side view of the cycle carrier with an alternate form of lifting apparatus.

An alternate form of lifting mechanism is shown in FIG. 3. Here like numerals refer to like parts in the first embodiment and numerals followed by the letter A denote similar parts with some modification made. Hence, platform 28 connects to vertical member 30 with a brace 32. Bike locking bracket 34 is attached to vertical member 30 as before. Upper bracket 44 passes around lift support 22A (which now has a pulley 78 rotatable at the top) and terminates with a roller 48 on the other side of the lift support 22A.

Lower bracket 46A also extends around lift support 22A and has a roller 50 bearing on the support from the opposite side. However, bracket 46A also has a cable crank 80 pivotally attached to the end of bracket 46A. A cable 82 extends from crank 80 over pulley 78 and down to the top 84 of vertical member 30. Handle 86 is rotated to wind up cable 82 and thus lift platform 28. As in the first embodiment guide 57 and roller 58 on support 22A additionally supports vertical member 30 when platform 28 has been pivoted outwardly from the camper. Rack 24A along lift support 22A, in conjunction with brackets 44 and 46A, and the connection of pin 56 with bracket 46A and lift support 22A, insure the rotation of lift support 22A with the pivoting of platform 28. Bolts 88, 90 are the pivot fastenings for lift support 22A. Support plate 92 on bumper 14 does not rotate but bearing plate 94 attached to lift support 22A and positioned on support plate 92 does rotate with the lift support. Pin 96 passes through apertures in plates 92 and 94 to prevent rotation of platform 28 when desired.

FIG. 4 is an end view of the lower lift mounting bracket 16 mounted over bumper 14 and onto camper 10. It includes a support plate 92 having an aperture 98 at its outer end to receive pivot bolt 88 which is affixed to the bearing plate 94 on lift support 22. This support plate 92 terminates in a flange 100 bearing against camper 10 and retained by a bolt 102. A lower brace 104 extends from below support plate 92 diagonally rearwardly and terminates in a flange 106 fastened to camper 10 below bumper 14 by bolt 108. A vertical member 110 extends between plate 92 and brace 104 in front of bumper 14. Pin 96 passes through apertures 112 and 114 for storage and may be inserted into sleeve 116 on bearing plate 94 when the support platform 28 swings outwardly from the camper.

FIG. 5 shows upper lift mounting bracket 20 for pivotally supporting pivot bolt 90 on the upper end of lift support 22. It consists of a rigid brace 118 attached at one end by bolts 120 to the rear end of camper 10 and at its other end to the side of the camper by bolts 122. A second brace, 124 in FIG. 7, fits within the first and fastens to it on either side of bolt 90 by bolts 126 and 128. As can be seen in FIG. 7 the two braces at their apex maintains bolt 90 in position.

FIG. 6 is an end view of the support positioning bracket 18. This includes an upper mounting bracket 130 attached to the camper 10 over bumper 14 by bolt 132 and a lower mounting bracket 134 attached to the camper 10 under bumper 14 by bolt 136. An upper support 138 and brace 140 are connected together at their outer ends and are pivotally mounted at their inner ends on bolt 142 to brackets 130 and 134. The outer end 144 of upper support 138 slopes downwardly as a ramp to receive the end of bike support platform 28. A retention bar 146 welded at one end onto upper support 138 is spaced from it at the other end to receive the fastening plate 148 on platform 28. Holes in plate 148, retention bar 146, and support 138, when aligned, receive pin 150. This maintains the bike platform against the rear end of the camper in its travel position.

FIG. 7 shows the support platform 28 in raised position but pivoted rearwardly to permit access to door 12 at the rear of camper 10. Pin 150, not shown, has been removed to permit fastening plate 148 to be withdrawn from between retention bar 146 and support 138.

Having thus described illustrative embodiments of the present invention, it is to be understood that other forms will occur to those skilled in the art. For example, various lifting apparatus may be employed using hydraulic or electrical sources and screw-worm or dog-type lifters having an appropriate mechanical advantage. It is to be understood that these modifications are considered to be part of this invention as set forth in the appended claims.

What I claim is:

1. A motorbike loader-carrier comprising:
a lift support,
brackets for mounting said support for pivotal movement on a vertical axis at the rear of a vehicle,
an L-shaped unit including a vertical member and a horizontal support platform,
said platform adapted to receive a motorbike thereon for elevation and retention,
roller means connecting said vertical member to said lift support for vertical movement thereon,
lift means on said vertical member cooperatively connected with said lift support for vertically lifting said L-shaped unit,
retention means between one of said brackets and said lift support to maintain said L-shaped unit in raised position when said unit is pivoted about said lift support, and
bracket means connectable with said support platform for maintaining said support platform in raised position and parallel with the rear end of a vehicle, said bracket means being connected to said vehicle and having an upper support and brace connected at their outer ends and extending rearwardly, said upper support sloping downwardly at its outer end to receive the end of said support platform thereon, said end having a fastening plate thereon with an aperture therein, a retention bar on said upper support and spaced therefrom at one end to receive said fastening plate therebetween, said bar and said upper support having aligned apertures therein whereby a pin passed therethrough maintains said support platform in raised travel position against the rear of said vehicle.

2. A motorbike loader-carrier as in claim 1 wherein said roller means includes rollers in vertical rolling contact with said lift support,
said rollers being connected to said vertical member by brackets extending past said lift support whereby said rollers are on one side of said lift support and said vertical member is on the side opposite,
said lift support having an aperture therein, one of said brackets having an aperture therein, said retention means comprising a pin insertable through said apertures to prevent vertical movement of said L-shaped unit and to cause rotation of said lift support upon rotation of said unit.

3. A motorbike loader-carrier as in claim 2, and a guide on said lift support having roller contact with said vertical member which with said roller means maintains said support platform in a horizontal position throughout its vertical movements.

4. A motorbike loader-carrier as in claim 1, said lift means including a gear rack attached to said lift support, a gear and crank mounted on one of said brackets with said gear engageable with said gear rack whereby rotation of said crank causes vertical movement of said support platform.

5. A motorbike loader-carrier as in claim 1, said lift means including a pulley on said lift support, a crank mounted on one of said brackets, and a cable connected to said crank and to said vertical member, said cable passing over said cable whereby rotation of said crank causes vertical movement of said support platform.

6. A motorbike loader-carrier as in claim 1, said lift support having a support plate on the bottom thereof rotatable therewith and having an aperture therein, said plate being rotatable on one of said mounting brackets also having an aperture therein, and a pin insertable into said apertures to prevent rotation of said lift support and said support platform.

7. A motorbike loader-carrier as in claim 1, said horizontal support platform having channels to receive the wheels of a motorbike, said vertical member having wheel locking means thereon engageable with one of said wheels.

* * * * *